April 3, 1962 L. A. DURANT 3,028,160

AUTOMATIC REJECTOR FOR PHONOGRAPHS

Filed Aug. 12, 1958 2 Sheets-Sheet 1

INVENTOR
Lyndon A. Durant

BY Lloyd E. Sanders

April 3, 1962 L. A. DURANT 3,028,160

AUTOMATIC REJECTOR FOR PHONOGRAPHS

Filed Aug. 12, 1958 2 Sheets-Sheet 2

INVENTOR
Lyndon A. Durant
BY Lloyd J. [illegible]

United States Patent Office 3,028,160

Patented Apr. 3, 1962

3,028,160

AUTOMATIC REJECTOR FOR PHONOGRAPHS

Lyndon A. Durant, Chicago, Ill., assignor to United Music Corporation, Chicago, Ill., a corporation of Illinois Filed Aug. 12, 1958, Ser. No. 754,656
4 Claims. (Cl. 274—1)

This invention relates in general to automatic phonographs and more particularly to a reject mechanism for initiating the operation of a record changer for the return transfer of each record upon the completion of its play by the tone arm, including auxiliary safety cut-off means for initiating the return of a record at any time during its play when the phonograph is subject to shock or other movement which would endanger the record and other components of the tone arm.

Phonographs previous to this invention, particularly coin operated phonographs, are aften subjected to intentional shock and movement by persons with malicious intent in an attempt to re-play a record by shocking the tone arm into its starting position. This type of abuse often results in damage to the record, needle or other parts of the machine to the extent that the phonograph is partially or totally disabled.

The present invention overcomes the above and other disadvantages by the provision of an improved cut-off device responsive to the predetermined movement of the tone arm at the completion of play and one or more inertia switches secured to the phonograph cabinet and responsive to shock in predetermined directions for returning the tone arm and rejecting the record at the normal finish of play or at any time during the play thereof when the cabinet is subjected to unnatural movement.

A principal object of the invention is the provision of a latch controlled electric switch means for initiating the record return transfer of a record in a phonograph including mechanical trip means responsive to the tone arm and electric means responsive to the operation of one or more inertia switches in the phonograph.

A further object of the invention is the provision of a cut-off device including a spring loaded latch and means driven by the record player for restoring said latch for successive operations during each record return cycle of said record player.

These and other objects and advantages in one embodiment of the invention are described and shown in the appended specification and drawings, in which.

Figure 1:
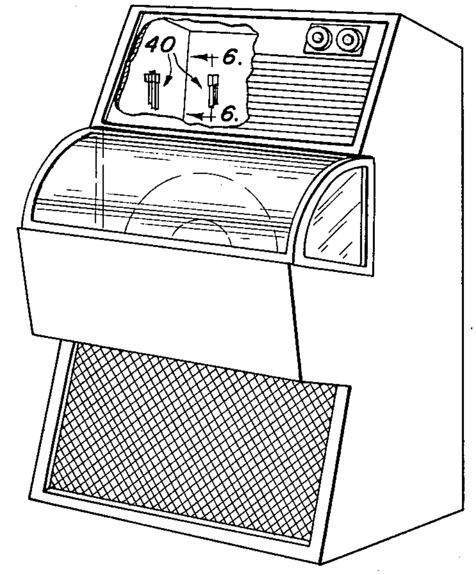
FIG. 1 is a perspective view of a typical coin operated phonograph with a portion broken away illustrating two inertia switches secured therein.
Figure 2:
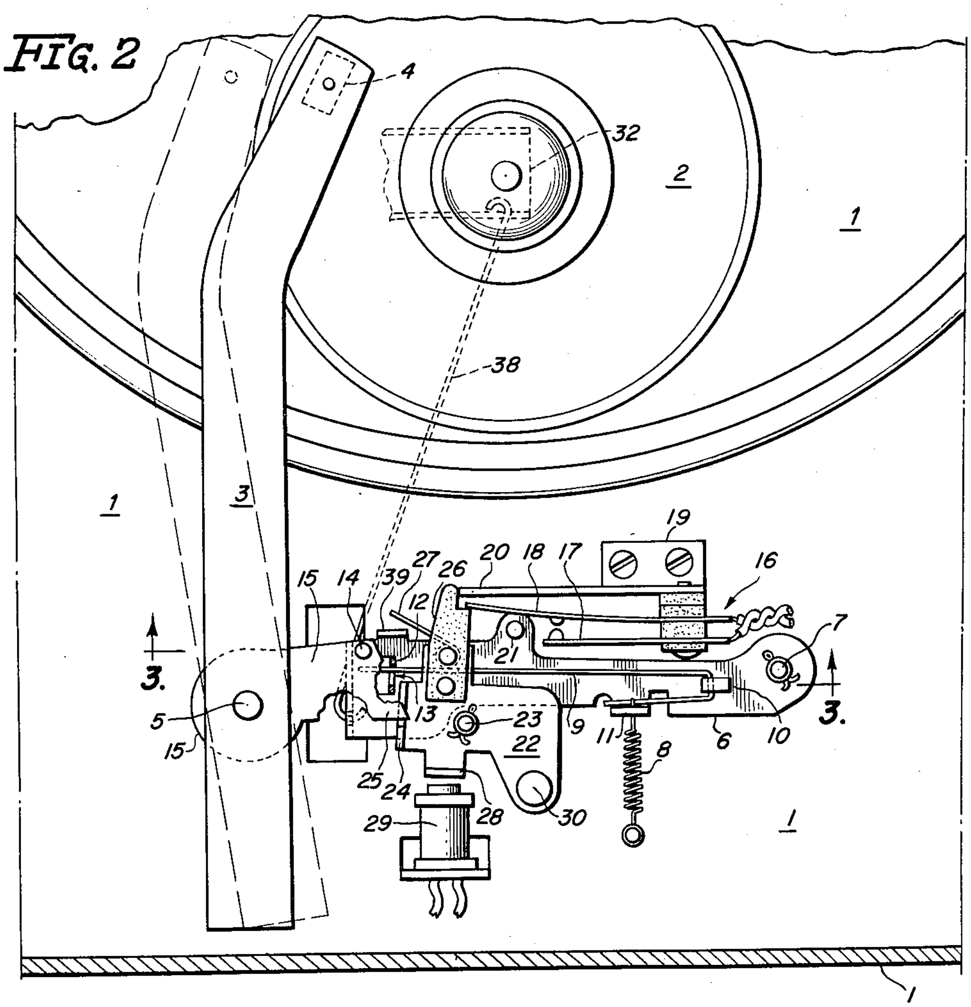
FIG. 2 is a plan view of the cut-off device positioned in relation to the tone-arm and turntable within the phonograph shown FIG. 1.

Referring to FIG. 2, a base plate 1 is positioned in horizontal position in the phonograph shown FIG. 1 and provides the support for the turntable 2, tone-arm 3 and cut-off device. In this embodiment the tone-arm is adapted to pivotally swing the transducer 4 over the turntable on a vertical shaft 5 journaled in base 1. The tone-arm is also pivoted for limited vertical movement by means not shown.

Figure 3:
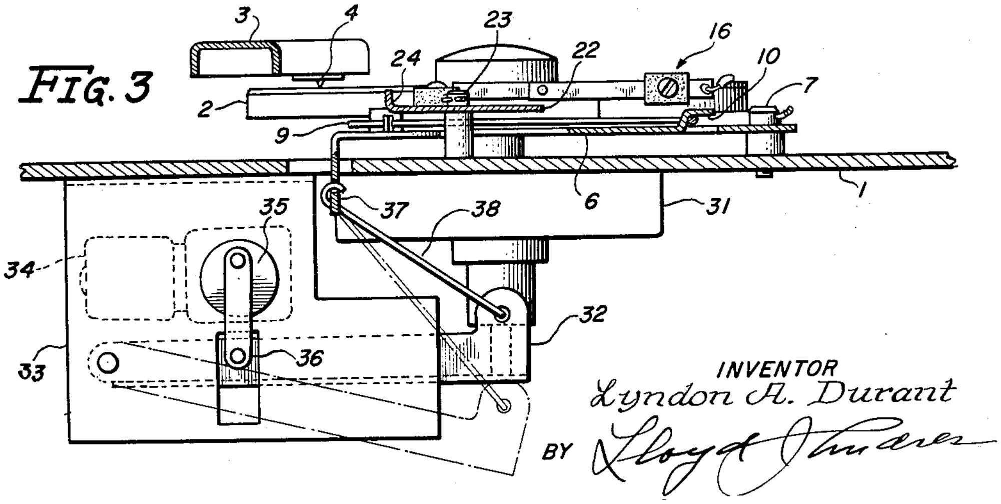
FIG. 3 is a cross sectional elevation taken through section line 3—3, FIG. 2.

The turntable is of the retractable type and adapted to raise a record transferred thereon into playing engagement with needle 5, FIG. 3, when operated, and the tone-arm is in its rest position as shown in dotted lines.

The cut-off device comprises a main restore arm 6 pivoted for horizontal movement about stud 7 secured in base 1 and normally urged in one direction by spring 8 biased between the arm and the base as shown.

A cantilever tone-arm restore spring 9 is formed to be retained on lever 6 by engagement with projections 10, 11 and 12 integral with lever 6 as shown. The free end of spring 9 is loosely retained in a slot 13 in upturned projection 12 and is normally urged into position shown FIG. 2 with its outer end in the path of movement of pin 14 which is retained in a tone-arm lever 15 fixed to shaft 5.

A normally closed cut-off switch 16 having two blades 17—18 is supported to base 1 by bracket 19 which includes a stop member 20. Blade 18 is positioned in the path of movement of a dielectric pin 21 secured in arm 6.

A trigger member 22 is pivoted for horizontal movement on stud 23 in base 1 with an upturned abutment 24 in the path of movement of projection 25 for movement thereby.

A dielectric friction member 26 is fixed to member 22 by rivets as shown, with one of said rivets retaining a light tortion spring 27 with its end in the path of movement of an up-turned lug 39 on lever 6 as shown. Another upturned lug 28 on member 22 serves as an armature for an electro-magnet 29 secured to the base adjacent thereto.

A counter-weight 30 on member 22 is provided to statically balance the member about its pivot, for preventing rotation from normal vibration forces in the base 1. The transmission means for raising and lowering the turntable comprise a crank operated beam 32 pivoted for reciprocation in suitable bearings, not shown, on bracket 33 secured to base 1.

A gear-motor 34 on bracket 33 is adapted to drive a crank connecting rod means 35—36 connected to beam 32, whereby successive 180 degree rotations of crank 35 will raise and lower turntable 2.

A downturned lug 37 of lever 6 projects through a clearance aperture in base 1 and is pivotally and obliquely connected to beam 32 by a wire rod 38.

Thus it is apparent that when the turntable is raised and lowered the restore lever 6 will reciprocate through a predetermined angle, the action of which will be hereinafter described.

Figure 6:
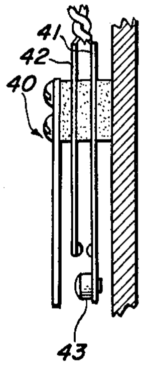
FIG. 6 is a side elevation of a normally open inertia switch shown FIG. 1.
Figure 4:
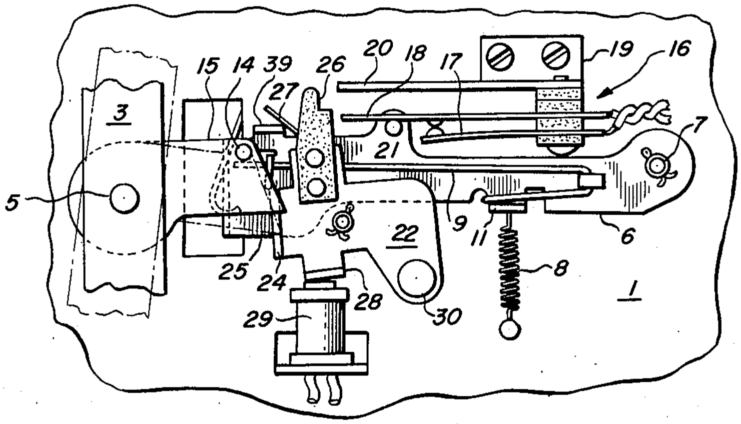
FIG. 4 is a fragmentary plan view of the cut-off device with elements in tripped position.

A pair of inertia switches 40 are secured to the inner walls of the phonograph cabinet at right angles to each other as illustrated in FIGS. 1 and 6. Each switch 40 has a flexible blade 41 with a weight 43 secured to its lower end and a relatively rigid blade 42 normally positioned in spaced relation to blade 41.

The two switches 40 are connected in parallel by a simple circuit running to a source of electric power and the electro-magnet 29 in the cut-off device. Thus it is apparent that when the cabinet is shocked in any lateral direction one of the switches 40 will momentarily close, by virtue of inertia present in weight 43, and energize the magnet 29 and attract armature 28 and rotate the trigger member 22.

In operation the elements of the device before and during the play of a record are in the position shown in FIG. 2 with the member 26 against the bracket 20 as a stop with the small land on the member positioned substantially tangent to the axis of rotation thereof and normally in light frictional engagement with contact spring 18 and holding switch 16 in open position.

When the tone-arm is moved to a predetermined cut-off position, projection 25 on lever 15 will engage abutment 24 of the trigger member 22 and move the same counterclockwise and release the latching engagement between the land of member 26 and blade 18, thru permitting switch 16 to close and energize a circuit to the record player, not shown, for starting the record player return transfer cycle. It is to be noted that arm 15 is provided with rotational adjustment with respect to the tone-arm, not shown, for adjusting the transducer in precise relation to the turntable.

Figure 5:
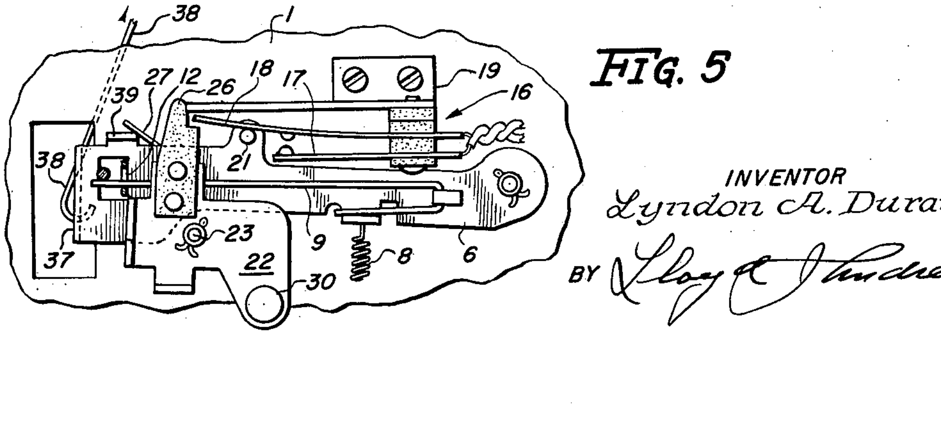
FIG. 5 is substantially the same as FIG. 4 with elements in restored position.

During the descent of the turntable with a record thereon at the beginning of the return transfer cycle the beam 32, shown FIG. 3, will retract lever 6 against the restrain-action of spring 8 to restore the tone-arm and the cut-off device. The end portion of spring 9 will engage pin 14 and lever 15 and move the tone arm to its original position, shown dotted lines FIGS. 2 and 5, and the resilience of spring 9 will permit predetermined angular compensation depending upon the adjustment of the rest position of the arm.

Simultaneously with the restoration of the tone-arm, lug 39 on lever 6 will engage tortion spring 27 and rotate trigger member into position for re-engaging blade 18 of switch 16. Further movement of lever 6 will move its pin 21 to engage and move blade 18 into position shown FIG. 5, with the land on the member 26 positioned for frictional re-engagement with spring 18.

When the lever 6 is returned to its normal position by reciprocation of beam 32 all cut-off elements are conditioned for a further operation. It is to be noted that when the electro-magnet 29 is momentarily energized the trigger member 22 will be moved in the same manner as when moved by the tone-arm.

Therefore it is now apparent that the lateral components of any shock forces applied to the phonograph will operate one of the switches 40 and momentarily energize electromagnet 29 and trip the cut-off device to be followed thereby by the descent of the turntable with the record thereon and the disengagement of the transducer from the record followed by the return of the tone-arm to its rest position.

In some instances the switch 40 can be connected directly to the record player reject circuit, however the return transfer cycle circuit in most cases requires a positive closed circuit of predetermined duration as provided by switch 16.

Having described my invention I claim:

1. A cut-off device for a phonograph comprising means forming a base, a record player means in said base for playing a plurality of records when operated, said player means including a turntable and a tone-arm means vertically pivoted on said base adapted to play each of said records on said turntable from a predetermined start to a predetermined cut-off position, electric transmission means in said player means for moving said tone-arm means from said cut-off to said start position when energized, a trip member fixed to said tone-arm means and movable therewith in an arcuate path, a trigger pivoted on said base for free oscillatory movement to and from holding and tripped positions, said trigger including a holding land tangent to the axis of said trigger, a restore abutment and a trip abutment on said trigger in predetermined annular and radial relation with the latter positioned in the path of movement of said trip member for tripping movement thereby when said tone-arm means is moved to said cut-off position, a self-closing electric switch on said base including an operating member therefor positioned for frictional holding engagement with said land and adapted to release said switch from a closed to an open circuit position when operated, a restore member articulated with said transmission means for movement thereby and movably secured to said base positioned and adapted to engage said restore abutment and move said trigger from said tripped to said holding position and to engage and move said operating member of said switch into said open circuit position and into frictional holding engagement with said land when said transmission means is operated, energized electric circuit means connecting said electric transmission means and said switch whereby the movement of said tone-arm means to said cut-off position will release said trigger from said holding engagement with said operating member and permit said switch to close and energize and operate said transmission means and restore said trigger to said holding position and operate said switch and de-energize said transmission means.

2. In a record player a cut-off device of the character described a means forming a base, a tone-arm means vertically pivoted on said base for movement from an adjustable start to a cut-off position, electric transmission means in said player for moving said tone-arm from said cut-off to start position when energized, a trip-arm secured to said tone-arm means movable therewith in fixed relation thereto, a trigger pivoted on said base for free oscillatory movement to and from holding and tripped positions, said trigger including a land substantially tangent to the axis of said trigger, a restore abutment and a trip abutment in predetermined radial relation with the latter positioned in the path of movement of said trip arm for tripping movement thereby when said tone-arm means is moved to said cut-off position, a self-closing electric switch on said base including an operating member therefor positioned for frictional holding engagement with said land and adapted to move said switch from a closed to an open circuit position when operated, a restore member articulated with said transmission means for movement thereby and movably secured to said base for predetermined travel positioned and adapted to engage said restore abutment and move said trigger from said tripped to said holding position and to engage and move said operating member of said swich into said open circuit position and into frictional holding engagement with said land when said transmission is operated, a tone-arm restore abutment secured to said tone-arm means in fixed relation and movable therewith, a spring means secured to said restore member positioned to yieldably engage said tone-arm restore abutment and move same and said tone-arm means from said cut-off position to each of a plurality of pre-adjusted said start positions, energized electric circuit means connecting said transmission means and said switch whereby the movement of said tone-arm means to said cut-off position will release said trigger and permit said switch to close and energize and operate said transmission means and simultaneously restore said trigger to said holding position and said tone-arm to said pre-adjusted start position and operate said switch to de-energize said transmission means.

3. In a phonograph a cut-off device of the character described a means forming a frame and a base, a tone arm means including a trip member vertically pivoted on said base for horizontal movement from a start to a predetermined cut-off position, a trigger pivoted on said base for free oscillatory movement to and from holding and tripped positions, said trigger including a holding land substantially tangent to the axis of rotation of said trigger and positioned at a predetermined distance therefrom, a trip abutment in predetermined annular and radial relation with respect to said axis with said trip abutment positioned in the path of movement of said trip member, a yieldable cut-off member secured at one end to said base and the opposite end thereof substantially tangent to the path of movement of said land and movable from a holding position frictionally engaged with said land to a cut-off position free from said land whereby the movement of said tone arm to said cut-off position will move said trip member against said trip abutment and rotate said trigger to release the said frictional engagement with said cut-off member and permit said member to move to its said cut-off position.

4. The construction recited in claim 3 including a counter weight secured to said trigger positioned to statically balance said trigger in its plane of oscillation for resisting movement thereof from normal vibration in said base.

References Cited in the file of this patent

UNITED STATES PATENTS

| | | |
|---|---|---|
| 2,230,106 | Erwood | Jan. 28, 1941 |
| 2,407,122 | Young | Sept. 3, 1946 |

| | | |
|---|---|---|
| 2,458,623 | Mortimer | Jan. 11, 1949 |
| 2,503,383 | Gesswein | Apr. 11, 1950 |
| 2,527,586 | Small | Oct. 31, 1950 |
| 2,545,360 | Johnson | Mar. 13, 1951 |
| 2,636,742 | Redfield | Apr. 28, 1953 |
| 2,662,945 | Cockram | Dec. 15, 1953 |
| 2,725,235 | Hull et al. | Nov. 29, 1955 |